United States Patent Office 2,858,319
Patented Oct. 28, 1958

2,858,319

DERIVATIVES OF IMIDAZOLIDINONE AND PYRIMIDINONE

Peter L. de Benneville, Philadelphia, Pa., assignor to Rohm & Haas Company, Philadelphia, Pa., a corporation of Delaware No Drawing. Application December 22, 1954
Serial No. 477,113

11 Claims. (Cl. 260—309.7)

This invention relates to novel chemical compounds which are variously useful, such as for sequestering polyvalent metal ions.

The new compounds of the present invention are carboxylic acids (and salts thereof) which have the general Formula I:

I
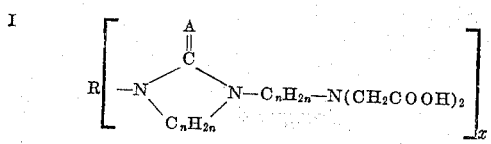

in which $n$ is an integer having a value of 2 to 3, $x$ is an integer having a value of 1 to 2, A is selected from the group consisting of oxygen and sulphur, R is methylene when $x$ is 2 and, when $x$ is 1, R is selected from H, —$CH_3$, —$CH_2OH$, —$CH_2OCH_3$ and —$CH_2OC_2H_5$, and the radical $C_nH_{2n}$ is selected from the group consisting of —$(CH_2)_2$—, —$(CH_2)_3$—, —$CH_2CH(CH_3)$—, and —$CH(CH_3)CH_2$—.

Certain of these compounds, in which $x$ is 1 and R is H or methyl, may be obtained by first condensing urea or thiourea with a polyakylenepolyamine of the Formula II:

(II)     

where $n$ is the same as above and R' is selected from H and methyl, such as diethylenetriamine, dipropylenetriamine and the N-methyl derivatives thereof in which R' is methyl, and then reacting the resulting N-aminoalkyl-substituted heterocyclic compound with a salt of an α-halogenoacetic acid in an alkaline medium.

The first condensation may be effected by heating the urea or thiourea with the polyalkylenepolyamine in equimolar proportions at a temperature of 100° C. to 300° C. to evolve ammonia as described in Hurwitz et al., U. S. Patent 2,613,212.

The second step may be effected at 0° C. to 100° C. and involves the reaction of at least 2 moles of the α-halogenoacetate, such as sodium chloroacetate, with each mole of the amine obtained from the first step. Any soluble inorganic alkaline material may be present, such as sodium hydroxide, potassium hydroxide, their carbonates, or calcium or barium hydroxide. The several materials may be added to each other in any order.

The salt may be obtained as an aqueous solution thereof and used as the solution, as in the case of the soluble sodium or potassium salts. Or an insoluble salt, as of barium, may be precipitated and isolated by filtration. The free acid may be obtained in aqueous solution from the solution of the salt or from an insoluble salt, such as the barium salt, by acidification with a strong mineral acid, such as sulfuric acid, or it may be isolated from the solution of the sodium salt by passing such solution through a cation-exchange resin, such as an insoluble sulfonated resin. The salt or acid solution may be concentrated or dehydrated completely by distilling off water.

The methylol substituted compounds, in which $x$ is 1 and R is —$CH_2OH$, are obtained from those compounds of Formula I in which $x$ is 1 and R is H by reacting them with the equimolar proportion of formaldehyde at a pH of 6 to 7 or higher such as up to 9. Preferably one mole of an inorganic alkali, such as sodium hydroxide is used for each mole of the compound of Formula I. The temperature of reaction may vary from 30° to 90° C. and the time required is inversely proportional to the temperature, such as from 0.5 to 1 hour at 90° C. to 8 hours or so at 30° C.

The alkoxymethyl-substituted compounds may be obtained from the methylol compounds by reacting the latter with an alcohol, such as methanol, ethanol, isopropanol, butanol or the like at reflux at a low pH, such as from 1 to 5 and preferably from 2 to 3.

The bis compounds in which R is —$CH_2$— and $x$ is 2 are obtained from those compounds of Formula I in which $x$ is 1 and R is H by reacting them at elevated temperatures of 50° to 90° C. with formaldehyde. While the proportion of formaldehyde may be varied widely, the preferred ratio is one mole of formaldehyde to two moles of the compound of Formula I to be reacted therewith. This reaction is effected in the presence of acid, such as hydrochloric or sulfuric acids, at a pH from 1 to 5 and preferably about 3. The time required is inversely proportional to the temperature, such as about one-half hour at 90° C. to 4 to 5 hours at 50° C.

All of the products of the invention have the ability to sequester polyvalent metal ions including calcium, aluminum and also heavy metal ions, such as lead, in alkaline solutions, apparently forming non-ionic complexes therewith which are normally stable in the presence of precipitants for the sequestered metal ion, such as carbon dioxide, and prevent precipitation of such metal ions as long as the aqueous system containing the complex is maintained on the alkaline side of pH values.

The compounds in which $x$ is 1 and R is methylol or alkoxymethyl are reactive to hydroxyl-containing substances, such as carbohydrates, and especially cellulosic materials, such as cotton, cellulose acetate, and regenerated cellulose including rayon and cellophane films. For example, the reaction with cellulose is effected under acid conditions (i. e., in the presence of about 0.2% to 1% of an acid catalyst) at about 120° C. to about 210° C. or even higher, such as 225° C. The time of such reaction may vary from 2 to 3 minutes at about 210° C. to about 20 to 30 minutes at 120° C. The amount thus reacted may be such as to increase the weight of the cellulosic or other material by 1% to 15%. When an increase of 5% to 15% in weight is effected, the cellulosic material, such as a cotton or rayon yarn or fabric, is rendered more resistant to degradation or weakening on exposure to strong alkalies and acids. Such materials also show greater receptivity for acidic and basic dyes. Cellophane and cloths thus reacted are useful for selective absorption of such metal ions as those of iron, lead, copper, manganese, nickel, cobalt, and so on. Thus, they may be used as permselective membranes or ion-exchange media.

The acid catalysts that may be used in this reaction include ammonium phosphate, ammonium thiocyanate, hydrochloric or other acid salts of a hydroxy aliphatic amine including 2-methyl-2-amino-1-propanol, 2-methyl-2-amino-1,3-propanediol, tris(hydroxymethyl)aminomethane, 2 - phenyl-2-amino-1-propanol, 2-methyl-2-amino-1-pentanol, 2 - aminobutanol, triethanolamine, 2 - amino-2-ethyl-1-butanol, also ammonium chloride, pyridine hydrochloride, benzyldimethylamine oxalate.

In the following examples, parts and percentages are by weight unless otherwise designated:

Example 1

(a) To a solution of 233 parts of sodium chloroacetate in 500 parts of water was added 171 parts of anhydrous barium hydroxide. To the resulting solution was then added, at 0° C., a solution of 129 parts of N-(β-aminoethyl)-2-imidazolidinone in 300 parts of water over a half-hour period, with stirring. After further stirring for a half-hour at 0° C., the temperature was allowed to rise and the reaction mixture stirred for three hours at room temperature. It was then heated to 90° C., and there precipitated the insoluble barium salt of the acid, 1-[β-(N,N-bis(carboxymethyl)amino)ethyl]-2-imidazolidinone having the structure of Formula III:

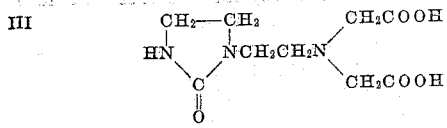

The barium salt was filtered off, washed with hot water and air dried. There resulted 201 parts of a colorless white powder, which contained 35.5% Ba (theory 36%) and 10.1% N (theory 11.0).

(b) To 190 parts of barium salt (obtained in part (a) hereof) suspended in 1500 parts of boiling water was added drop-wise over a period of one hour a solution of 50 parts of 98% sulfuric acid in 500 parts of water. The mixture was heated for 8 hours on the steambath, filtered, and evaporated to a total of about 300 parts of solution. To this was added 400 parts of methanol, and the precipitated acid of Formula III above was removed by filtration. This amounted to 55 parts of colorless crystals, melting with decomposition at 194° to 196° C.; percent N found 16.7 (theory 17.1). It was soluble in water and aqueous solutions of acids and alcoholics. Potentiometric titration of a sample with 0.1 N NaOH gave two breaks, at pH 5.5, corresponding to a neutral equivalent of 247 (theory 245) and a second weaker one at pH 10.3 corresponding to a neutral equivalent of 122.5 (theory 122.5). A less pure material, 25.5 parts, was obtained by further evaporation and precipitation with methanol.

(c) To 38 parts of the barium salt (of part (a) hereof) in 200 parts of water was added 10.6 parts of sodium carbonate. Precipitated barium carbonate was removed, and the solution evaporated to give 30 parts of the corresponding sodium salt. When a small amount of material was added to lime water, and carbon dioxide passed in, no precipitation occurred.

Example 2

(a) The procedure of Example 1(a) was repeated, substituting 157 parts of N-(γ-aminopropyl)-tetrahydro-2-pyrimidinone for the 129 parts of N-(β-aminoethyl)-2-imidazolidinone. The colorless white powder obtained was the barium salt of the acid, 1-[γ-(N,N-bis(carboxymethyl)amino)propyl]-tetrahydro-2-pyrimidinone having the structure of Formula IV:

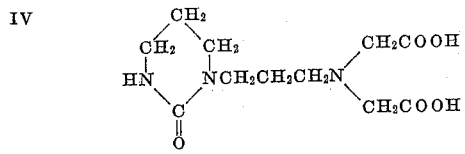

(b) The free acid of Formula IV was isolated from the barium salt of part (a) hereof by the procedure of Example 1(b).

(c) Calcium ions were sequestered by the sodium salt of the acid of Formula IV by repeating the procedure of Example 1(c) with the barium salt obtained in part (a) of Example 2.

Example 3

(a) A mixture was made of 49 parts of the free acid of Formula III obtained in Example 1(b), 8.2 parts of 36.5% formaldehyde in water, 4 parts of water and 0.5 part of concentrated (36%) hydrochloric acid. The mixture was heated for thirty minutes on the steambath, and on cooling the product precipitated. It was further precipitated by the addition of methanol, and filtered to give 48 parts of colorless crystals of the methylene-bis-derivative having the structure of Formula V:

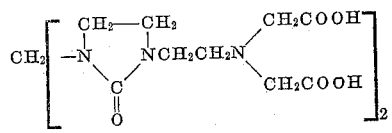

(b) The procedure of part (a) hereof was repeated, replacing the acid of Formula III entirely with 54.6 parts of the free acid of Formula IV obtained in Example 2(b) to produce the methylene-bis-derivatives having the structure of Formula VI:

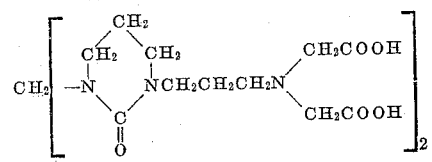

Example 4

(a) A solution was made of 49 parts of the free acid of Formula III obtained in Example 1(b), 16.4 parts of 36.5% formaldehyde solution, and a solution of 8 parts of sodium hydroxide in 120 parts of water. The pH of this solution was 6–7 by indicator. It was heated for one hour at 80° C. Analysis of the aqueous solution of the product showed no free formaldehyde and 3.0% combined formaldehyde (theory 3.1%) corresponding to the mono-sodium salt of the dicarboxylic acid compound having the structure of Formula VII:

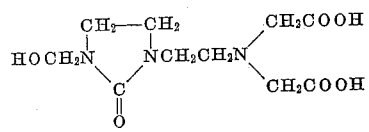

(b) Swatches of cotton and rayon were padded in aqueous solutions containing a 12.5% of the mono-sodium salt obtained in part (a) hereof and 0.5% ammonium chloride, dried and cured slack for ten minutes at 300° F. The pickup was between 83 and 98% for these materials. The treated swatches could be exposed to concentrated hydrochloric acid and 5% caustic solutions without apparent damage. In the base form, they absorbed copper and iron from basic solutions.

Example 5

(a) The procedure of Example 4(a) was repeated, substituting the acid of Formula III entirely with 54.6 parts of the acid of Formula IV obtained in Example 2(b) to produce the mono-sodium salt of the dicarboxylic acid compound having the structure of Formula VIII:

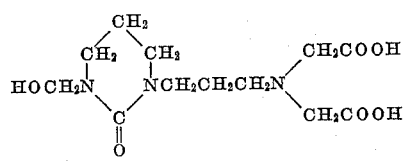

(b) On repeating the procedure of Example 4(b), but replacing the mono-sodium salt used there with the mono-sodium salt obtained in part (a) hereof, similar resistant and metal ion absorptive properties were found in the treated swatches.

Example 6

The procedure of Examples 1(*a*) and 1(*b*) was repeated, substituting 143 parts of 1-(β-aminoethyl)-3-methyl-2-imidazolidinone for the 129 parts of the imidazolidinone used in Example 1(*a*) to produce the barium salt of the acid, and also the free acid, having the structure of Formula IX:

IX 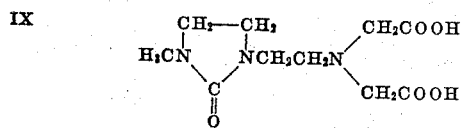

Example 7

Example 6 is repeated substituting 171 parts of 1-(β-aminopropyl) - 5 - methyl - 2 - imidazolidinethione for the imidazolidinone there used, to produce the barium salt of the acid, as well as the free acid, having the structure of Formula X:

X 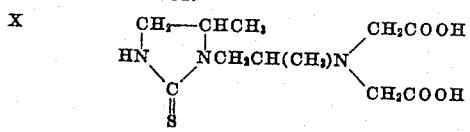

Example 8

Example 6 is repeated, substituting 145 parts of N-(β-aminoethyl)-2-imidazolidinethione for the imidazolidinone there used, to produce the barium salt of the acid, and the free acid, having the structure of Formula XI:

XI 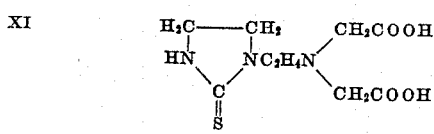

It is to be understood that changes and variations may be made without departing from the spirit and scope of the invention as defined in the appended claims.

I claim:

1. As a composition of matter, a compound selected from the group consisting of compounds, and alkali metal and alkaline earth metal salts thereof, having the formula

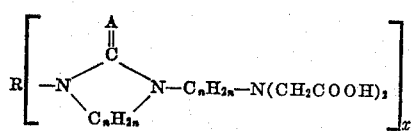

in which $n$ is an integer having a value of 2 to 3, $x$ is an integer having a value of 1 to 2, A is selected from the group consisting of oxygen and sulfur, R is methylene when $x$ is 2 and, when $x$ is 1, R is selected from the group consisting of H, —$CH_3$, —$CH_2OH$, —$CH_2OCH_3$, and —$CH_2OC_2H_5$, and the radical $C_nH_{2n}$ is selected from the group consisting of —$(CH_2)_2$—, —$(CH_2)_3$—, —$CH_2CH(CH_3)$—, and —$CH(CH_3)CH_2$—.

2. 1 - [β - (N,N - bis(carboxymethyl)amino)ethyl]-2-imidazolidinone.

3. A compound of the formula

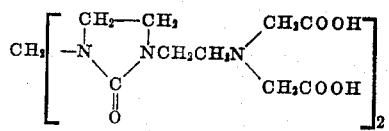

4. A compound of the formula

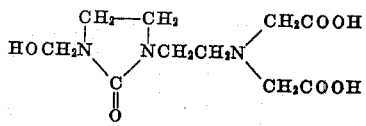

5. A compound of the formula

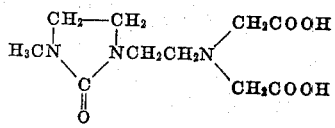

6. A compound of the formula

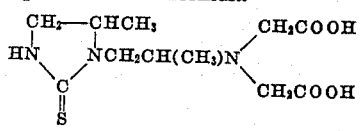

7. The method of producing a compound of claim 1 which comprises reacting a compound having the formula

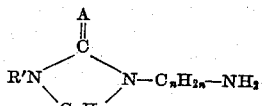

in which A is selected from the group consisting of oxygen and sulfur, $n$ is an integer having a value of 2 to 3, the radical $C_nH_{2n}$ is selected from the group consisting of —$(CH_2)_2$—, —$(CH_2)_3$—, —$CH_2CH(CH_3)$—, and —$CH(CH_3)CH_2$, and R' is selected from the group consisting of hydrogen and methyl, with an alkali metal salt of α-halogenoacetic acid.

8. A method as defined in claim 7 which comprises the subsequent step of acidifying the reaction medium to form an acid of the formula

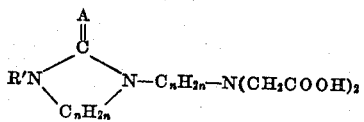

and then recovering this acid therefrom, R', A, and $n$ being as defined in claim 7.

9. A method as defined in claim 8 which comprises the subsequent step of reacting the aforesaid acid with formaldehyde.

10. A method as defined in claim 9 in which the reaction with formaldehyde is effected at a pH of 6 to 9, the acid and formaldehyde being provided in approximately equimolar amounts.

11. A method as defined in claim 9 in which the reaction with formaldehyde is effected at a pH of 1 to 5, the acid being provided in approximately twice the molar amount of formaldehyde.

No references cited.